US009706415B2

(12) United States Patent
Ponnuswamy (10) Patent No.: US 9,706,415 B2
(45) Date of Patent: Jul. 11, 2017

(54) METHOD FOR RF MANAGEMENT, FREQUENCY REUSE AND INCREASING OVERALL SYSTEM CAPACITY USING NETWORK-DEVICE-TO-NETWORK-DEVICE CHANNEL ESTIMATION AND STANDARD BEAMFORMING TECHNIQUES

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 127 days.

(21) Appl. No.: 14/069,166

(22) Filed: Oct. 31, 2013

(65) Prior Publication Data

US 2015/0117324 A1    Apr. 30, 2015

(51) Int. Cl.
*H04W 16/28* (2009.01)
(52) U.S. Cl.
CPC .................................. *H04W 16/28* (2013.01)
(58) Field of Classification Search
CPC .... H04B 7/024; H04B 7/0408; H04B 7/0413; H04B 7/0417; H04B 7/0452; H04B 7/0456; H04B 7/0478; H04B 7/0482; H04B 7/0617; H04B 7/0619; H04B 7/0621; H04B 7/0626; H04B 7/0639; H04B 7/0691; H04B 7/0695; H04B 7/0842; H04B 7/086; H04B 15/00; H04B 7/0421; H04B 7/061;

(Continued)

(56) References Cited

U.S. PATENT DOCUMENTS 4,012,740 A *  3/1977  Lenneper ............ G01S 13/4418
                                                    342/148
7,039,013 B2 *  5/2006  Ruutu .................... H04L 47/762
                                                    370/235

(Continued)

OTHER PUBLICATIONS

Dawod et al., Improved Transmit Null Steering for MIMO-OFDM Downlinks With Distributed Base Station Antenna Arrays, Mar. 2006, IEEE Journal on Selected Areas in Communications, vol. 24 No. 3, pp. 419-426.*

(Continued)

*Primary Examiner* — Michael Thier
*Assistant Examiner* — Eric Nowlin
(74) *Attorney, Agent, or Firm* — Brooks, Cameron & Huebsch, PLLC (57) ABSTRACT

Disclosed is a system, apparatus, and method for RF management using network-device-to-network-device channel estimation and standard beamforming techniques. The exemplary method comprises: obtaining a first information corresponding to a first device that is a target device for transmitting at least one of a plurality of wireless signals by a network device; obtaining a second information corresponding to a second device that is to be avoided by propagation of any wireless signals transmitted by the network device; computing a radiation pattern for transmitting the plurality of wireless signals based at least on the first information associated with the first device and the second information associated with the second device; and transmitting the plurality of wireless signals based on the radiation pattern.

20 Claims, 3 Drawing Sheets

(58) Field of Classification Search
CPC .... H04B 7/063; H04B 7/0632; H04B 7/0634; H04B 7/0636; H04B 7/0643; H04B 7/088; H04B 2201/709709; H04B 7/043; H04B 17/24; H04W 16/28; H04W 24/08; H04W 24/02; H04W 64/00; H04W 72/0413; H04W 72/042; H04W 72/0426; H04W 72/046; H04W 72/082; H04W 72/1284; H04W 84/12; H04W 88/08; H04L 1/0026; H04L 1/0027; H04L 1/0031; H04L 1/1671; H04L 1/1854; H04L 1/1896; H04L 5/001; H04L 5/0053; H04L 5/0055; H04L 5/0057; H04L 5/0073; H04L 25/0202; H04L 25/0204; H04L 25/0206; H04L 25/0224; H04L 25/0228; H04L 25/0242; H04L 25/03292; H04L 2025/03414; H04L 2025/03426

See application file for complete search history.

(56) References Cited

U.S. PATENT DOCUMENTS

| | | | |
|---|---|---|---|
| 7,433,322 B1* | 10/2008 | Alapuranen | G01S 5/0221 370/252 |
| 7,848,444 B2* | 12/2010 | Yamaura | H04B 7/0421 375/260 |
| 8,111,782 B2* | 2/2012 | Kim | H04B 7/063 375/260 |
| 8,332,216 B2* | 12/2012 | Kurniawati | G10L 19/02 704/200 |
| 8,396,162 B2* | 3/2013 | Thomas | H04B 7/0634 375/259 |
| 8,406,332 B2* | 3/2013 | Bayesteh | H04B 7/0417 341/173 |
| 8,542,776 B2* | 9/2013 | Kim | H04B 7/063 375/260 |
| 8,885,453 B2* | 11/2014 | Stager | H04L 27/0006 370/201 |
| 8,976,761 B2* | 3/2015 | Stager | H04W 24/02 370/334 |
| 9,123,986 B2* | 9/2015 | Shamblin | H01Q 9/06 |
| 9,241,275 B2* | 1/2016 | Kloper | H04W 16/28 |
| 9,444,577 B1* | 9/2016 | Zhang | H04L 1/0026 |
| 9,571,316 B2* | 2/2017 | Kim | H04L 27/148 |
| 2004/0114546 A1* | 6/2004 | Seshadri et al. | 370/310.2 |
| 2007/0117590 A1* | 5/2007 | Aldana | H01Q 3/30 455/562.1 |
| 2007/0206504 A1* | 9/2007 | Koo | H04B 7/0408 370/245 |
| 2007/0286303 A1* | 12/2007 | Yamaura | H04B 7/0421 375/267 |
| 2008/0056414 A1* | 3/2008 | Kim | H04B 7/063 375/347 |
| 2008/0075033 A1* | 3/2008 | Shattil | 370/328 |
| 2008/0273618 A1* | 11/2008 | Forenza et al. | 375/261 |
| 2009/0135754 A1* | 5/2009 | Yavuz | H04W 74/04 370/311 |
| 2009/0137221 A1* | 5/2009 | Nanda | H04W 74/04 455/296 |
| 2010/0111223 A1* | 5/2010 | Thomas | H04B 7/0634 375/296 |
| 2010/0124212 A1* | 5/2010 | Lo | H04B 7/0617 370/338 |
| 2011/0032173 A1* | 2/2011 | Chang | H01Q 3/04 343/880 |
| 2011/0176629 A1* | 7/2011 | Bayesteh | H04B 7/0417 375/267 |
| 2011/0205968 A1* | 8/2011 | Kim | H04W 72/085 370/328 |
| 2011/0273977 A1* | 11/2011 | Shapira | H04B 7/0452 370/208 |
| 2012/0114028 A1* | 5/2012 | Davydov | H04B 7/024 375/224 |
| 2012/0170674 A1* | 7/2012 | Kim | H04B 7/063 375/267 |
| 2012/0202431 A1* | 8/2012 | Hawryluck et al. | 455/63.4 |
| 2012/0213300 A1* | 8/2012 | Yamaura | H04B 7/0417 375/260 |
| 2012/0231739 A1* | 9/2012 | Chen | H04B 7/026 455/41.2 |
| 2012/0315938 A1* | 12/2012 | Van Nee | H04B 7/0434 455/507 |
| 2014/0062784 A1* | 3/2014 | Rison | 342/368 |
| 2014/0093005 A1* | 4/2014 | Xia | H04B 7/0617 375/267 |
| 2014/0098681 A1* | 4/2014 | Stager | H04W 24/02 370/252 |
| 2014/0334473 A1* | 11/2014 | Zhang et al. | 370/338 |
| 2015/0030094 A1* | 1/2015 | Zhang | H04B 7/0456 375/267 |
| 2015/0084744 A1* | 3/2015 | Havens | G06K 7/10356 340/10.3 |
| 2015/0117324 A1* | 4/2015 | Ponnuswamy | H04W 16/28 370/329 |
| 2015/0131593 A1* | 5/2015 | Stager | H04W 24/02 370/329 |
| 2015/0155623 A1* | 6/2015 | Shamblin | H01Q 9/06 342/367 |
| 2015/0244430 A1* | 8/2015 | Shattil | H04B 1/0003 370/254 |
| 2015/0270882 A1* | 9/2015 | Shattil | H04B 1/0003 370/329 |
| 2015/0282144 A1* | 10/2015 | Tomeba | H04B 7/0456 370/329 |
| 2015/0289155 A1* | 10/2015 | Gao | H04L 5/0057 370/252 |
| 2015/0318878 A1* | 11/2015 | Damodaran | H04B 7/04 375/296 |
| 2015/0350942 A1* | 12/2015 | Wei | H04W 24/08 370/330 |
| 2016/0006595 A1* | 1/2016 | Mueller | H04L 25/0202 375/260 |
| 2016/0119049 A1* | 4/2016 | Cui | H04B 7/0639 375/267 |
| 2016/0127024 A1* | 5/2016 | Morita | H04B 7/10 370/329 |
| 2016/0142117 A1* | 5/2016 | Rahman | H04B 7/0469 375/267 |
| 2016/0182135 A1* | 6/2016 | Onodera | H04B 7/0452 |
| 2016/0268676 A1* | 9/2016 | Chang | H01Q 3/04 |
| 2016/0294589 A1* | 10/2016 | Kim | H04L 27/265 |
| 2016/0373230 A1* | 12/2016 | Morita | H04J 11/00 |
| 2016/0373939 A1* | 12/2016 | Buskgaard | H04B 1/525 |

OTHER PUBLICATIONS

Qamar et al., Null Steering, A Comparative Analysis, Dec. 15, 2009, IEEE 13th International Multitopic Conference, pp. 1-5.*

Hakkarainen et al., RF-Aware Widely-Linear Beamforming and Null-Steering in Cognitive Radio Transmitters, Jul. 10, 2013, 2013 8th International Conference on Cognitive Radio Oriented Wireless Networks (CROWNCOM), pp. 172-177.*

* cited by examiner

METHOD FOR RF MANAGEMENT, FREQUENCY REUSE AND INCREASING OVERALL SYSTEM CAPACITY USING NETWORK-DEVICE-TO-NETWORK-DEVICE CHANNEL ESTIMATION AND STANDARD BEAMFORMING TECHNIQUES

FIELD

One embodiment of the disclosure relates to wireless digital networks, and in particular, to the problem of efficiently managing radio frequency (RF) resources and effectively sharing RF resources between two or more wireless network devices.

BACKGROUND

Network-device-to-network-device interference in wireless digital networks has been and remains to be one of the major bottlenecks that negatively affect the overall system capacity in dense deployments where wireless network devices are routinely ceiling-mounted.

The draft IEEE 802.11ac standard introduces wider 80-megahertz (MHz) and 160-MHz RF channels. While the 5-gigahertz (GHz) ISM band specified by the draft IEEE 802.11ac standard offers a higher total bandwidth than the 2.4 GHz frequency band, wider channels and utilization of the dynamic frequency selection (DFS) technique, as well as other regulatory restrictions mean the number of channels available in a particular deployment of a wireless digital network operating in accordance with the draft IEEE 802.11ac standard remains limited. Oftentimes, only 3 or 4 channels are available in such a deployment.

Therefore, the introduction of the draft IEEE 802.11ac standard does not by itself alleviate the problem of network-device-to-network-device interference. In either IEEE 802.11n networks or draft IEEE 802.11ac networks, it is inevitable that in dense deployments in both the 2.4 GHz and the 5 GHz bands, some wireless network devices will be within the interference and communication ranges of other wireless network devices operating on the same channel or on adjacent channels.

Techniques that address the network-device-to-network-device interference problem by adjusting transmit power of the wireless network devices are not always the best solution, as they may adversely affect the reliability of connections between wireless network devices and client devices.

BRIEF DESCRIPTION OF THE DRAWINGS

Embodiments of the disclosure may best be understood by referring to the following description and accompanying drawings that are used to illustrate embodiments of the disclosure by way of example and not limitation. In the drawings, in which like reference numerals indicate similar elements.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

Disclosed herein, one embodiment of the disclosure is directed to a system, apparatus, and method for RF management using device-to-device channel estimation and standard beamforming techniques. The exemplary method comprises: obtaining a first information corresponding to a first device that is a target device for transmitting at least one of a plurality of wireless signals by a network device; obtaining a second information corresponding to a second device that is to be avoided by propagation of any wireless signals transmitted by the network device; computing a radiation pattern for transmitting the plurality of wireless signals based at least on the first information associated with the first device and the second information associated with the second device; and transmitting the plurality of wireless signals based on the radiation pattern.

Further disclosed is an embodiment wherein subsequent to transmission, the plurality of wireless signals propagate to the first device at a first received signal strength that is above a first minimum strength and do not propagate to the second device at a signal strength that is above a second minimum strength.

Of course, other features and advantages of the disclosure will be apparent from the accompanying drawings and from the detailed description that follows below.

In the following description, certain terminology is used to describe features of the disclosure. For example, in certain situations, the term "logic" is representative of hardware, firmware and/or software that is configured to perform one or more functions. As hardware, logic may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The disclosure herein describes embodiments of the disclosure with reference to the IEEE 802.11n and the draft IEEE 802.11ac standards. However, the invention is not so limited and can be adapted for wireless digital networks operating under other standards within the spirit and scope of the embodiments disclosed herein.

Figure 1A:
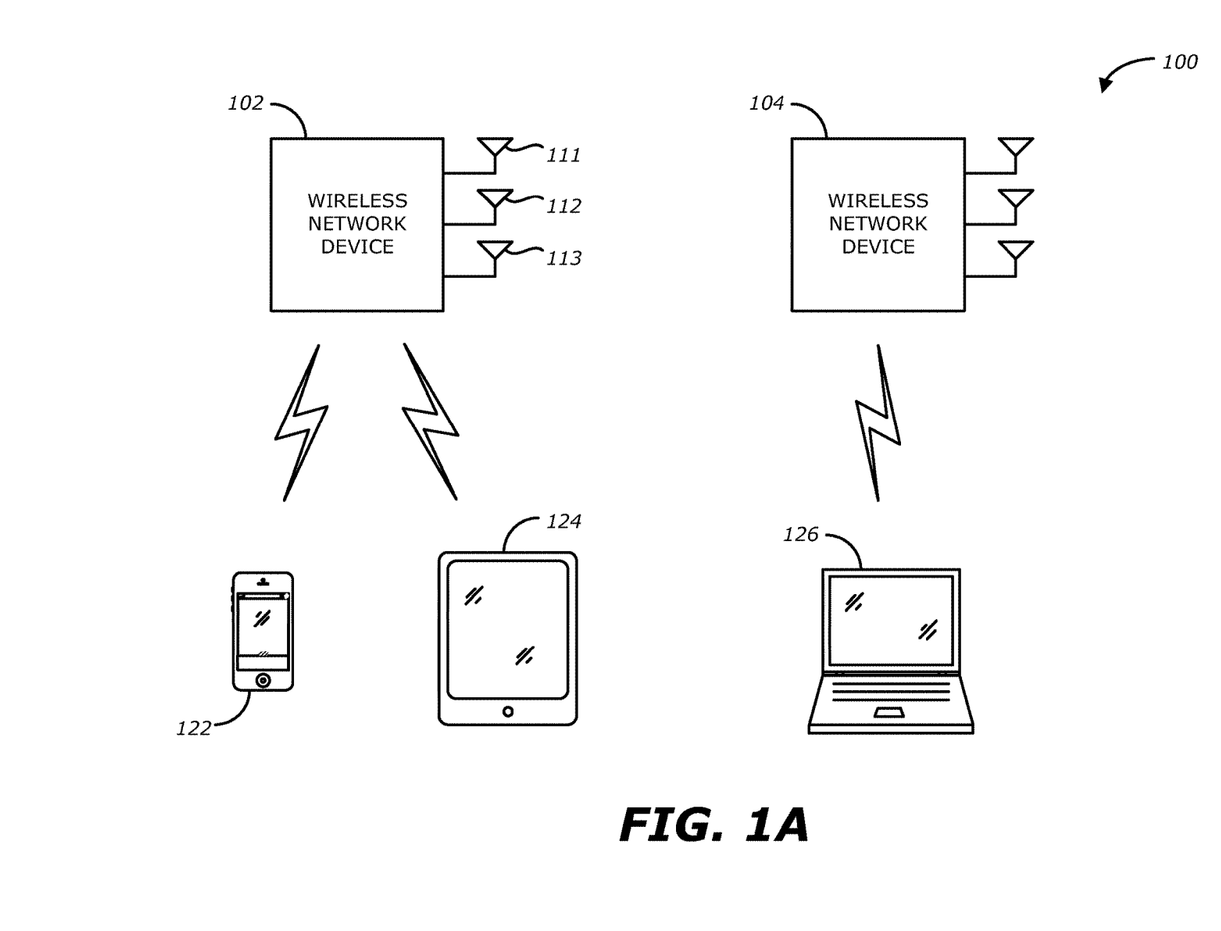
FIG. 1A illustrates a hardware environment of an exemplary wireless digital network in which embodiments of the disclosure may be practiced.

FIG. 1A illustrates a hardware environment of an exemplary wireless digital network 100 in which embodiments of the disclosure may be practiced. A first wireless network device (e.g., an access point, or a mesh node, etc.) 102 is communicatively coupled to a data network (not shown) and provides data access services to client devices 122 and 124 through RF wireless communications. Similarly, a second wireless network device 104 provides data access service to a client device 126 through RF wireless communications. The wireless network devices 102 and 104 operate in conformity with one or more standards in the IEEE 802.11 family of standards. In one embodiment, the wireless network device 102 supports the IEEE 802.11n, IEEE 802.11g, IEEE 802.11b, and IEEE 802.11a standards. In another embodiment, the wireless network device 102 supports all the aforementioned IEEE 802.11 standards and the draft IEEE 802.11ac standard. Similarly, the wireless network device 104 may support one or more IEEE 802.11 standards.

Of course, it is contemplated that the invention is not so limited and a number of different combinations of supported IEEE 802.11 standards are possible, and embodiments of the disclosure require only that the wireless network devices 102 and 104 support at least one of the IEEE 802.11n and the draft IEEE 802.11ac standards. The wireless network devices 102 and 104 may operate on either one or both of the 2.4 GHz RF band and the 5 GHz RF band while operating in conformity with the IEEE 802.11n standard, and operate on the 5 GHz RF band only while operating in conformity with the draft IEEE 802.11ac standard.

Although in the wireless digital network 100 illustrated in FIG. 1A, the wireless network device 102 is associated with client devices 122 and 124, and the wireless network device 104 is associated with the client device 126, the invention is not so limited. A skilled artisan should recognize that other client devices may join the wireless digital network 100 by associating with one of the wireless network devices 102 and 104, and that existing client devices may switch associated wireless network devices within the wireless digital network 100, or may leave the wireless digital network 100 altogether. Each of the wireless network devices 102 and 104 may have zero, one, or more client devices associated with it.

Moreover, although the wireless digital network 100 of FIG. 1A includes two wireless network devices 102 and 104, the invention is not limited by the number of wireless network devices present in the wireless digital network 100. Embodiments of the disclosure described herein may be practiced in any wireless digital network 100 containing two or more wireless network devices, each of which may be communicatively coupled to an external controller (not shown) through a wired interface.

In the example shown in FIG. 1A, the wireless network device 102 includes three antennas 111, 112, and 113. The wireless network device 102 may be capable of driving some or all of its antennas as either transmit antennas or receive antennas. The invention is not limited by the number of antennas included in the wireless network device 102 and the wireless network device 102 may include only two antennas, or may include more than three antennas. The wireless network device 102 is capable of driving at least two transmit antennas.

The IEEE 802.11n standard allows up to four separate spatial streams, while the draft IEEE 802.11ac standard allows up to eight separate spatial streams. Each spatial stream may be transmitted through one or more transmit antennas. Therefore, the number of spatial streams supported by the wireless network device 102 is limited by the number of transmit antennas it is capable of driving. Moreover, some implementations of the wireless network device 102 may support fewer spatial streams than would be allowed by the number of transmit antennas present.

The description relating to antennas of the wireless network device 102 applies equally to antennas of the wireless network device 104 and at least some of the other wireless network devices possibly present in the wireless digital network 100. The wireless digital network 100 may also contain wireless network devices capable of driving only one transmit antenna. However, exemplary methods described herein may be utilized only by wireless network devices capable of driving at least two transmit antennas.

Herein, client devices 122, 124, and 126 may be any electronic devices capable of accessing wireless digital networks operating in accordance with one or more standards in the IEEE 802.11 family of standards. Examples include laptops, cellphones, tablets, game consoles, smart TVs, set-top boxes, etc.

Figure 1B:
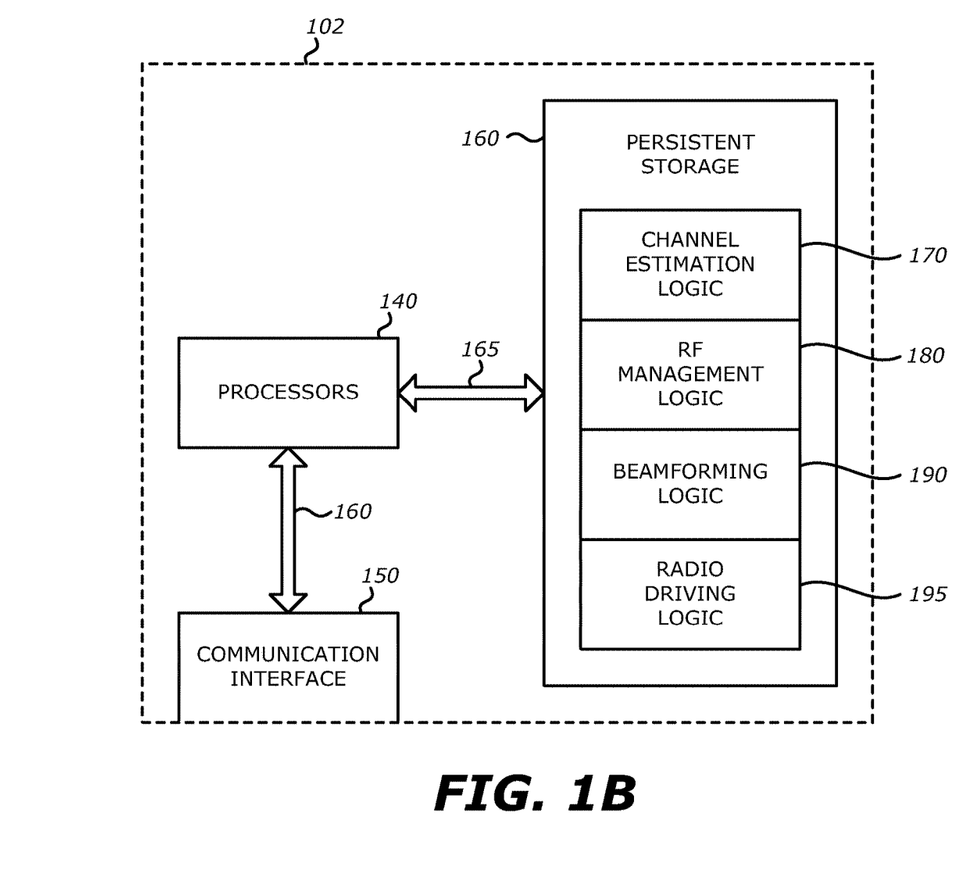
FIG. 1B is an exemplary block diagram of logic associated with an exemplary wireless network device.

Referring now to FIG. 1B, an exemplary block diagram of logic associated with the wireless network device 102 is shown. The wireless network device 102 comprises one or more processors 140 that are coupled to communication interface logic 150 via a first transmission medium 160. Communication interface logic 150 enables communications with the data network (not shown), with client devices 122 and 124 of FIG. 1A, with the wireless network device 104 of FIG. 1A, and possibly with the external controller (not shown). According to one embodiment of the disclosure, communication interface logic 150 may be implemented as one or more radio units coupled to antennas 111, 112, and 113 for supporting wireless communications with other devices. Additionally, communication interface logic 150 may be implemented as a physical interface including one or more ports for wired connectors.

Processor 140 is further coupled to persistent storage 160 via transmission medium 165. According to one embodiment of the disclosure, persistent storage 160 may include channel estimation logic 170, RF management logic 180, beamforming logic 190, and radio driving logic 195. Of course, when implemented as hardware, channel estimation logic 170, RF management logic 180, beamforming logic 190, and radio driving logic 195 would be implemented separately from persistent memory 160.

Wireless network device 104 and other wireless network devices in the wireless digital network 100 are associated with the same or similar logic as is shown in FIG. 1B.

The IEEE 802.11n standard includes the technique of transmit beamforming (TxBF) for use in transmitting data between a wireless network device and a single client device at a time, and the draft IEEE 802.11ac standard specifies the technique of downlink multi-user multiple-input multiple-output (MU-MIMO), through the use of which a wireless network device can transmit separate data on separate spatial streams to multiple client devices simultaneously. The draft IEEE 802.11ac standard utilizes the beamforming technique at the wireless network device in the MU-MIMO mode to minimize interference among spatial streams intended for different client devices.

Embodiments of the disclosure are practiced in the context of the beamforming technique. Beamforming allows a transmitting device with more than one transmit antenna to steer RF signal power maxima onto a receiving device using Digital Signal Processing techniques, enabling higher data rates and/or lower error rates. This is achieved by carefully controlling the phase of the signal transmitted from multiple antennas to optimize the overall radiation pattern of the beamformed signal. Moreover, the beamforming technique also allows a transmitting device with more than one transmit antenna to steer RF signal power minima (i.e., nulls) onto a device using Digital Signal Processing techniques to minimize interference to the device.

An estimate at the beamformer of RF conditions between transmit antennas at the beamformer and receive antennas at the beamformee, such as the channel state, for example, is utilized to derive one or more steering matrices. The steering matrices are used to weight streams of data transmitted through the multiple transmit antennas to generate beamformed RF signals.

Conventionally, a wireless network device utilizes the beamforming technique to steer signal power maxima onto client devices for which the signal is intended, and in some instances also to steer signal power minima onto client devices for which the signal is not intended. Embodiments of the disclosure adapt the conventional beamforming technique such that a wireless network device steers signal minima onto other wireless network devices to actively minimize interference to other wireless network devices.

It is also contemplated that in a similar fashion, a wireless network device may steer signal minima onto client devices associated with other wireless network devices to minimize interference to such client devices. All the references to "other wireless network devices" herein may also include unassociated client devices, where applicable.

Embodiments of the disclosure are described herein as exemplary methods with reference to the wireless network device 102 as the beamformer and the wireless network device 104 as the beamformee. A skilled artisan, however, should recognize that the example methods are equally applicable to other wireless network devices in the wireless digital network 100 as either beamformers or beamformees and are fully reciprocal with the sole exception that a wireless network device capable of driving only one transmit antenna cannot operate as a beamformer. In other words, according to one embodiment of the disclosure, each and every wireless network device meeting the criteria in the digital wireless network 100 utilizes the exemplary methods described herein and steers signal minima onto one or more of the other wireless network devices so that interference among wireless network devices across the whole wireless digital network 100 is minimized.

Figure 2:
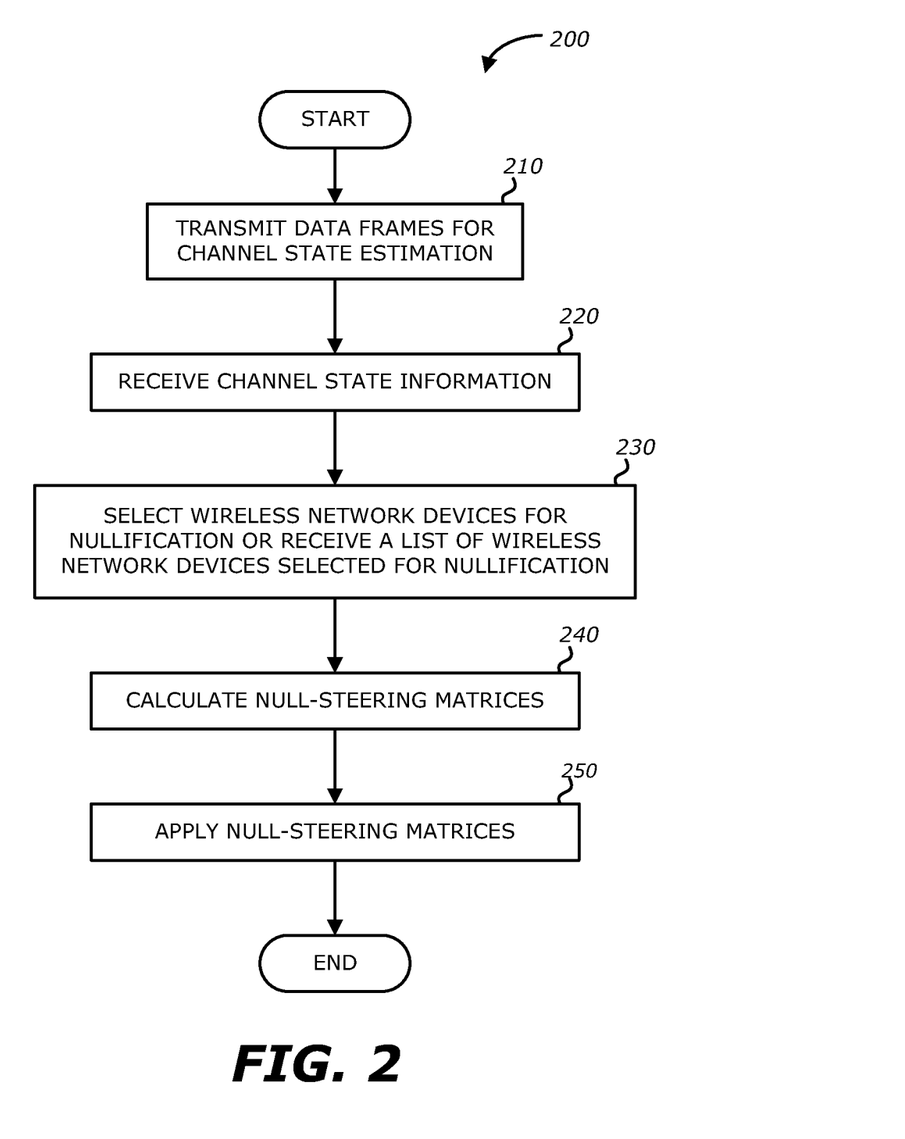
FIG. 2 is an exemplary flowchart illustrating a method for minimizing interference between wireless network devices using the beamforming technique.

Referring to FIG. 2, an exemplary flowchart of a method 200 for minimizing interference between wireless network devices using the beamforming technique is shown. At operation 210, the wireless network device 102 transmits on the RF channel on which it operates as well as on adjacent channels one or more data frames for channel state estimation to other wireless network devices within interference and communication ranges. These other wireless network devices may include two or more wireless network devices or a single wireless network device such as wireless network device 104. The data frames for channel state estimation may be in the form of a beacon frame, a sounding frame similar to the one used with TxBF and MU-MIMO techniques (e.g., a sounding frame used during off-channel scanning for RF management), or another proprietary data frame suitable for the purpose of channel state estimation. The frequency at which such data frames are transmitted may be selected strategically on account of the fact that RF conditions between wireless network devices are relatively slow-changing because wireless network devices are usually installed at fixed locations.

At operation 220, the wireless network device 102 receives the channel state information from other wireless network devices within interference and communication ranges operating on the same or adjacent channels. These other wireless network devices may include two or more wireless network devices or a single wireless network device such as wireless network device 104. The channel state information may be received directly from other wireless network devices or may be exchanged through an external controller.

In one embodiment, the channel state information is transmitted among wireless network devices over a wired interface to avoid unnecessary over-the-air overhead. The frequency at which the channel state information is transmitted or exchanged may be selected strategically, and may be different from the frequency at which the data frame transmission of operation 210 is performed. In one embodiment, both frequencies are dynamically adjusted at runtime based on changes in the channel matrix or other configured parameters.

It should be appreciated that the channel state information for the RF link from the wireless network device 102 to another wireless network device (e.g., wireless network device 104) transmitted at operation 220 is derived at said another wireless network device (e.g., wireless network device 104) after said another wireless network device (e.g., wireless network device 104) has received and analyzed the frames for channel state estimation transmitted by the wireless network device 102 at operation 210. Because the exemplary methods described herein are fully reciprocal, it should be further appreciated that the wireless network device 102 during operations 210 and 220 may simultaneously also be engaged in receiving frames for channel state estimation from other wireless network devices, including wireless network device 104, generating channel state information for RF links from other wireless network devices to the wireless network device 102, and transmitting channel state information to other wireless network devices, including the wireless network device 104.

In one embodiment, the wireless network device 102 associates as a client to another wireless network device (e.g., the wireless network device 104) in order to solicit and collect channel state information utilizing mechanisms specified in IEEE 802.11 standards.

In the embodiments where a client device associated with a wireless network device other than the wireless network device 102 is to be avoided by the wireless network device 102, the wireless network device 102 may obtain the channel state information by listening to frames transmitted by the client device and estimating the channel, or by using either the implicit feedback method or the explicit feedback method specified in the IEEE 802.11 standards. If the explicit feedback method is to be used, the wireless network device 102 may spoof the wireless network device with which the client device is associated and send a sounding frame directly to the client device in order to obtain the channel state information for the RF channel from the wireless network device 102 to the client device to be avoided.

Next, at operation 230, the wireless network device 102 selects one or more of the other wireless network devices for nullification or receives a list of selected wireless network devices for nullification from an external controller. These wireless network devices selected for nullification may include two or more wireless network devices or a single wireless network device such as wireless network device 104. The wireless network device 102 can nullify one or more of the other wireless network devices (e.g., wireless network device 104) by steering RF signal power minima onto the one or more of the other wireless network devices. The maximum number of the other wireless network devices that the wireless network device 102 can nullify is limited by the particular hardware and/or software implementation of the wireless network device 102.

Due to constraints on the number of wireless network devices that the wireless network device 102 can nullify, an RF management logic is utilized to select the one or more of the other wireless network devices to be nullified based on RF management criteria. In one embodiment, the wireless network device 102 executes the RF management logic and selects the one or more wireless network devices to be nullified; in another embodiment, the RF management logic is executed on an external controller to determine which of the other wireless network devices is to be nullified for each of the wireless network devices in the wireless digital network 100, and the wireless network device 102 receives a list of the selection for itself from the external controller.

Next, at operation 240, the wireless network device 102 calculates one or more null-steering matrices. A null-steering matrix is a steering matrix, which, when applied to a data frame under transmission, steers signal power minima (i.e., nulls) onto a null-beamformee (e.g., the wireless device 104) to nullify the null-beamformee so that interference to the null-beamformee caused by the wireless network device 102 is minimized. According to embodiments of the disclosure, null-beamformees are one or more of the other wireless network devices in the wireless digital network 100. One null-steering matrix is calculated for every wireless network device to be nullified by the wireless network device 102. As described above, it is contemplated that client devices not associated with the wireless network device 102 may also be null-beamformees so that interference to these client devices caused by the wireless network device 102 is minimized.

Last, at operation 250, the wireless network device 102 applies one or more null-steering matrices to its RF transmissions to nullify one or more of the other wireless network devices (e.g., the wireless network device 104). The one or more null-steering matrices are applied to all transmissions, including but not limited to beacons, probe responses, and other unicast frames including control frames, to all client devices such that signal power minima are always steered onto the one or more of the other wireless network devices selected at operation 230 for nullification.

The null-steering matrices may be applied with or without the standard TxBF or MU-MIMO techniques. It should be appreciated that applying the one or more null-steering matrices to all transmissions is equivalent to creating a default radiation pattern with the beamforming technique such that interference between wireless network devices is minimized. When the exemplary methods described herein is combined with the standard TxBF or MU-MIMO techniques, signal maxima are steered onto intended client devices to increase performance, while signal minima are steered onto one or more of the other wireless network devices such that interference between wireless network devices is minimized.

A skilled artisan would recognize that with beamformed radiation patterns, the null-beamformee(s) may be physically closer to the beamformer than a device onto which signal maxima are steered by the beamformer. It is also possible that a null-beamformee is physically situated between two devices onto which signal maxima are steered. Description herein regarding physical locations of the null-beamformee(s) is illustrative, and does not limit the invention in any way.

Utilizing embodiments of the disclosure described herein allows for increased overall system capacity of a wireless digital network and denser deployments of wireless network devices without adverse impacts on reliability of connections because the RF transmit power need not be reduced. Moreover, embodiments of the disclosure described herein may be combined with receiver cancellation techniques to further reduce interference between wireless network devices.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer-readable medium storing computer program instructions that, when executed by a network device, cause the network device to:
   transmit, on a first radio frequency (RF) channel and an adjacent RF channel, a data frame for channel state estimation at a first frequency;
   estimate channel state information using the data frame;
   transmit, at a second frequency, channel state information based on the channel state estimation;
   obtain a first information corresponding to a first device that is a target device to receive wireless signals transmitted by the network device;
   obtain a second information corresponding to a second device to which the network device is to avoid transmitting the wireless signals, wherein the second device is a wireless network device, wherein
      the first information and the second information are based, at least in part, on the channel state information;
   compute a radiation pattern for transmitting the wireless signals based at least on the first information associated with the first device and the second information associated with the second device, wherein the radiation pattern is to steer a maxima of the wireless signals to a first client device associated with the first device and to steer a minima of the wireless signals to a second client device associated with the second device;
   obtain a radio frequency (RF) management criteria; and
   transmit the wireless signals based on the radiation pattern and the RF management criteria, wherein the minima of the wireless signals is to nullify the maxima of the wireless signals at the second client device.

2. The non-transitory computer-readable medium of claim 1, wherein the instructions are to cause the network device to compute the radiation pattern using a beamforming technique.

3. The non-transitory computer-readable medium of claim 1, wherein the instructions are to cause the network device to transmit the wireless signals to propagate to the first device at a first received signal strength that is above a first minimum strength and to not propagate to the second device at a signal strength that is above a second minimum strength.

4. The non-transitory computer-readable medium of claim 1, wherein the first device is at a first distance away from the network device, wherein the second device is at a second distance away from the network device, and wherein the first distance is greater than the second distance.

5. The non-transitory computer-readable medium of claim 4, wherein the instructions are to cause the network device to further compute the radiation pattern based on a third information indicating that a third device is also a target device to receive the wireless signals transmitted by the network device, wherein the third device is at a third distance away from the network device, and wherein the third distance is greater than the second distance.

6. The non-transitory computer-readable medium of claim 5, wherein each of the first device, the second device, and the third device is in a first direction within a same 180-degree angle from the network device, and wherein a direction toward the second device is between a second direction toward the first device and a third direction toward the third device.

7. The non-transitory computer-readable medium of claim 1, wherein the network device and the second device are both access points.

8. The non-transitory computer-readable medium of claim 7, wherein to obtain the second information, the instructions are to cause the network device to associate the second device as a client device to the network device.

9. The non-transitory computer-readable medium of claim 1, wherein to obtain the second information, the instructions are to cause the network device to determine the second information based on wireless signals received by the network device from the second device.

10. The non-transitory computer-readable medium of claim 1, wherein to obtain the second information, the instructions are to cause the network device to communicate with the second device while spoofing a third device that is in communication with the second device.

11. A non-transitory computer-readable medium storing computer program instructions that, when executed by a network device, cause the network device to:
transmit, at a first frequency, a data frame for channel state estimation on a radio frequency (RF) channel associated with the network device;
analyze the data frame by channel state estimation;
receive, over a wired interface, channel state information relating to channel states affecting wireless transmissions from the network device to a first access point and a second access point simultaneously at a second frequency, wherein the channel state information is based on the channel state estimation, and
wherein the channel state information is associated with one or more (RF) channels;
use the channel state information to compute a radiation pattern that is to steer a minima of a set of wireless signals to the second access point and to steer a maxima of the set of wireless signals to at least one client device; and
transmit the set of wireless signals to the at least one client device and the second access point using the radiation pattern, wherein the minima of the set of wireless signals is to nullify the maxima of the set of wireless signals at the second access point.

12. The non-transitory computer-readable medium of claim 11, wherein the instructions are to cause the network device to compute the radiation pattern using a beamforming technique.

13. The non-transitory computer-readable medium of claim 11, wherein to obtain the channel state information, the instructions are to cause the network device to associate the second device as a client device to the second access point.

14. A wireless network apparatus comprising:
a transceiver;
a plurality of antennas coupled to the transceiver;
a controller coupled to the transceiver to control the transceiver and the plurality of antennas; and
a memory coupled to the controller, the memory containing instructions which, when executed by the controller, cause the controller to:
transmit, on a first radio frequency (RF) channel and an adjacent RF channel, a data frame for channel state estimation at a first frequency;
perform channel state estimation using the data frame;
transmit, at a second frequency, channel state information based on the channel state estimation;
obtain a first information corresponding to a first device that is a target device to receive wireless signals transmitted by the wireless network apparatus,
obtain a second information corresponding to a second device to which the wireless network apparatus is to avoid transmitting the wireless signals, wherein the second device is a wireless network device,
compute a radiation pattern for transmitting the wireless signals based at least on the first information associated with the first device and the second information associated with the second device, wherein the radiation pattern is to steer a maxima of the wireless signals to a first client device associated with the first device and to steer a minima of the wireless signals to a second client device associated with the second device, and
drive the transceiver and the plurality of antennas to transmit the wireless signals based on the radiation pattern, wherein the minima of the plurality of wireless signals is to nullify the maxima of the plurality of wireless signals at the second client device.

15. The wireless network apparatus of claim 14, wherein the instructions are to cause the wireless network apparatus to compute the radiation pattern using a beamforming technique.

16. The wireless network apparatus of claim 14, wherein the wireless network apparatus and the second device are both access points.

17. The wireless network apparatus of claim 16, wherein to obtain the second information, the instructions are to cause the network device to associate the second device as a client device to the wireless network apparatus.

18. The wireless network apparatus of claim 14, wherein to obtain the second information, the instructions are to cause the wireless network apparatus to determine the second information based on wireless signals received by the wireless network apparatus from the second device.

19. A wireless network apparatus comprising:
a transceiver;
a plurality of antennas coupled to the transceiver;
a controller coupled to the transceiver to control the transceiver and the plurality of antennas; and
a memory coupled to the controller, the memory containing instructions which, when executed by the controller, cause the controller to:
transmit, on a first radio frequency (RF) channel and an adjacent RF channel, a data frame for channel state estimation at a first frequency;
analyze the data frame by channel state estimation;
transmit, at a second frequency, channel state information based on the channel state estimation;
receive the channel state information relating to channel states affecting wireless transmissions from the wireless network apparatus to a first access point and a second access point simultaneously, wherein the channel state information is associated with one or more radio frequency (RF) channels;
use the channel state information to compute a radiation pattern that is to steer a minima of a set of wireless signals to the second access point and to steer a maxima of the set of wireless signals to at least one client device, and control the transceiver and the plurality of antennas to transmit the set of wireless signals to the at least one client device and the second access point using the radiation pattern, wherein the minima of the set of wireless signals is to nullify the maxima of the set of wireless signals at the second access point.

20. The wireless network apparatus of claim 19, wherein the instructions are to cause the wireless network apparatus to generate the radiation pattern using a beamforming technique.

\* \* \* \* \*